US005583778A

United States Patent [19]
Wind

[11] Patent Number: 5,583,778
[45] Date of Patent: Dec. 10, 1996

[54] COMPUTER METHOD FOR COLLECTING ON JUDGMENTS

[75] Inventor: H. Lee Wind, Rockaway Park, N.Y.

[73] Assignee: Instasearch Corp., New York, N.Y.

[21] Appl. No.: 309,668

[22] Filed: Sep. 21, 1994

[51] Int. Cl.$^6$ ................................................. G06F 17/60
[52] U.S. Cl. ...................... 364/464.01; 364/400; 395/234
[58] Field of Search ................................... 364/400, 401, 364/464.01

[56] References Cited

U.S. PATENT DOCUMENTS 5,111,395  5/1992  Smith et al. ......................... 364/401 X

*Primary Examiner*—Edward Cosimano
*Attorney, Agent, or Firm*—R. Neil Sudol; Henry D. Coleman

[57] ABSTRACT

In a method for collecting on judgments, zip code data is maintained in electronic form in a memory of a digital computer. The zip code data includes, for each given zip code, a list of respective zip codes all geographically contiguous to the given zip code. Bank data is also maintained in electronic form in the memory of the digital computer. The bank data includes bank identification information and address zip codes for banks covered by the bank data. In implementing the method, a zip code for a judgment defendant is entered into the computer. The computer is then operated to determine (i) a plurality of zip codes contiguous to the entered zip code and (ii) target banks with addresses having one of the entered zip code and the determined contiguous zip codes. Upon determination of the contiguous zip codes and the target banking institutions, the computer automatically prints (i) correspondence to at least some of the determined target banks and (ii) mailing addresses for use on envelopes for the correspondence.

11 Claims, 3 Drawing Sheets

COMPUTER METHOD FOR COLLECTING ON JUDGMENTS

BACKGROUND OF THE INVENTION

This invention relates to a method using a computer for use in collecting on judgments.

A problem endemic to civil litigation is the collection of judgments against defendants. A plaintiff's troubles and an attorney's work frequently continue even after a monetary award has been obtained from a court. The award must be collected from the defendant or defendants.

Collection on a judgment frequently requires that bank accounts be located and process served on the banking institutions. This is a time consuming process. Banks possibly containing defendants' funds must first be located and then contacted to determine whether one or more judgment defendants have accounts at the respective institutions. Upon ascertaining the existence of defendants' bank accounts, process must be served, responses tracked, and money collected.

The entire collections process is generally urgent because of the possibility that defendants will close the bank accounts in anticipation of collection. The funds are either converted into some other form or transferred out of the country.

Another problem with the collections process is compensation for the collections work. Understandably, judgment plaintiffs are not willing to pay an amount greater than the amount to be collected. Generally, judgment plaintiffs are willing to pay only some fraction of the judgment award. Frequently, the payment is made as a contingency, out of any amount that may be collected on the judgment.

Throughout the collections process, records must be maintained to identify which banks have been canvassed, which banks have defendants' accounts, which banks have been served, which banks have responded, how much money has been collected from the different accounts, etc.

OBJECTS OF THE INVENTION

An object of the present invention is to provide a computer method for collecting on judgments.

Another object of the present invention is to provide such a method which optimizes the likelihood of uncovering banks holding accounts of judgment defendants.

These and other objects of the present invention will be apparent from the drawings and detailed descriptions herein.

SUMMARY OF THE INVENTION

A method for collecting on judgments comprises, in accordance with the present invention, the step of maintaining zip code data in electronic form in a memory of a digital computer, the zip code data including, for each given zip code, a list of respective zip codes all geographically contiguous to the given zip code. The method also includes the step of maintaining bank data in electronic form in the memory of the digital computer, the bank data including bank identification information and address zip codes for banks covered by the bank data. In implementing the method, a zip code for a judgment defendant is entered into the computer. The computer is then operated to determine (i) a plurality of zip codes contiguous to the entered zip code and (ii) target banks with addresses having one of the entered zip code and the determined contiguous zip codes. Upon determination of the contiguous zip codes and the target banking institutions, the computer automatically prints (i) correspondence to at least some of the determined target banks and (ii) mailing addresses for use on envelopes for the correspondence.

The correspondence alerts the target banks as to the existence of a judgment against one or more identified defendants and inquires about the existence of accounts in the name or names of the defendants. The mailing addresses may be printed directly on envelopes or on mailing labels.

According to further features of the present invention, the method further comprises the steps of operating the computer to automatically calculate costs of mailing the correspondence, inputting spending limit information into the computer, and terminating the printing step upon the attainment of a total mailing cost at least equal to a predetermined spending limit. The computer may be operated to automatically compute the predetermined spending limit from the spending limit information.

According to another feature of the present invention, the method further comprises the step of entering into the computer an additional zip code for the judgment defendant. In that case, the computer is operated to automatically determine (a) a plurality of further zip codes contiguous to the additional zip code and (b) additional target banks with addresses having one of the additional zip codes and the further zip codes. The computer then automatically prints correspondence to at least some of the additional target banks and mailing addresses for use on envelopes for such correspondence.

Preferably, zip codes for the judgment defendant entered into the computer correspond to home and work addresses for the judgment defendant.

In accordance with another feature of the present invention, the method further comprises the step of additionally operating the computer to determine (1) a plurality of further zip codes contiguous to the determined contiguous zip codes and (2) further target banks with addresses having one of the further zip codes. The computer automatically prints (1) correspondence to at least some of the further target banks and (2) mailing addresses for use on envelopes for such correspondence. In accordance with a further feature of the present invention, the method further comprises the step of operating the computer to automatically eliminate, from among the further zip codes, each zip code identical to one of the determined contiguous zip codes.

In accordance with a further feature of the present invention, the method further comprises the step of maintaining, in electronic form in the memory and for each the given zip code, a list of counties including a primary county in which the given zip code is located and all counties geographically contiguous to the primary county, the bank data including bank identification information and address zip codes for banks located in the counties. The computer is operated to determine (A) a plurality of counties contiguous to the primary county of the entered zip code and (B) further target banks located in one of the primary county and the determined contiguous counties. Upon the determination of the contiguous counties and the target banks in those counties, the computer prints (i) correspondence to at least some of the further target banks and (ii) mailing addresses for use on envelopes for such correspondence.

A computer method in accordance with the present invention enables attorneys to intelligently and cost effectively locate judgment debtors' bank accounts. It is contemplated that the computer method provides prompts to the operator, soliciting information about the debtor, combines the input information with bank industry data, and filters the results via an algorithm to generate a multi-tiered list of likely banking institutions. The computer method includes built-in cost management features which enable the attorney who works on a contingency basis, or who is restricted by a client's budget, to mail only to those banks where it is statistically likely that a direct deposit account will be maintained. Here, the computer method takes into account the costs of issuing its own restraining notices based on user definable expenses.

Generally, it is contemplated that the computer is provided with a list of banks in a predetermined area about the location of the attorney's office or in another metropolitan area of the user's choosing. Additional areas can be subsequently added, if necessary or desired.

DETAILED DESCRIPTION

Figure 1:
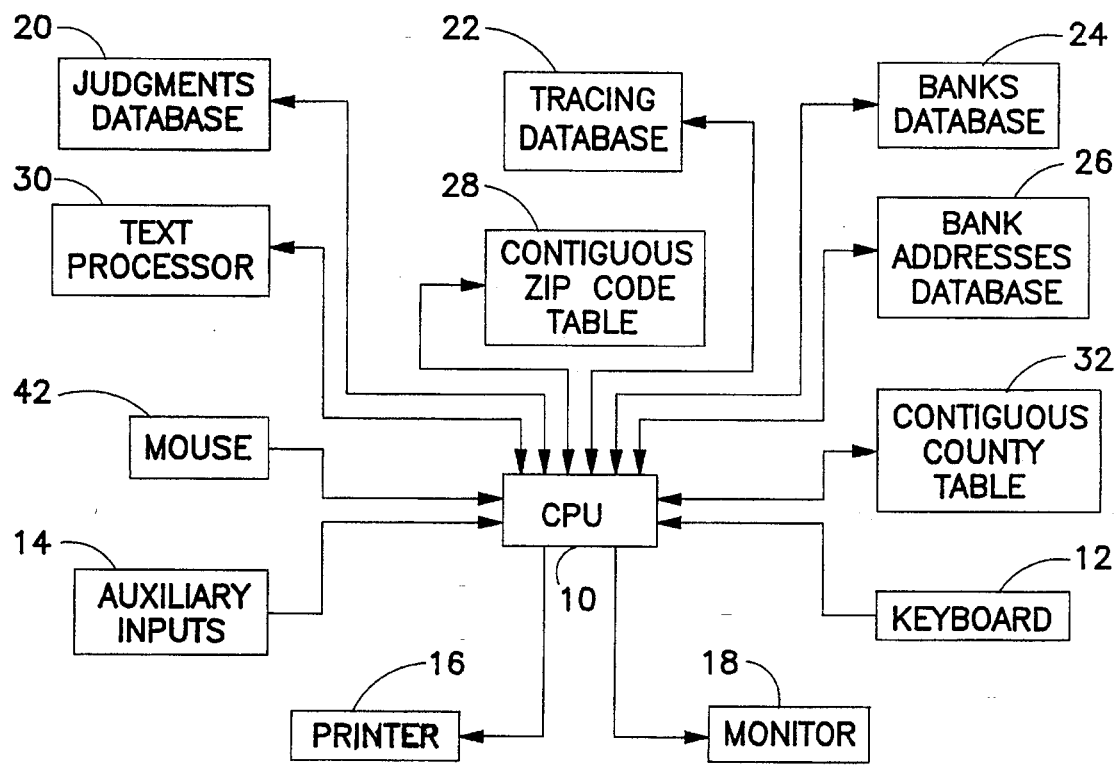
FIG. 1 is a block diagram of a collections system in accordance with the present invention.

As illustrated in FIG. 1, a judgment collections system comprises a central processing unit 10 (e.g., a personal computer microprocessor) connected to a keyboard 12, an auxiliary input 14 such as read/write componentry of a floppy drive, a printer 16, and a monitor 18. Central processing unit or CPU 10 is also connected to a judgments database 20 which contains a list of outstanding judgments and pertinent information such as the identities of the plaintiff(s) and the defendant(s), judgment amounts, percentages of judgment awards representing amounts the plaintiffs are willing to pay for collecting on the respective judgments, the plaintiffs' and defendants' addresses, the social security numbers of the defendants, etc.

A tracking database 22 is operatively connected to CPU 10 and stores information relating to the processing of the judgments. More particularly, database 22 maintains records as to which banks have been contacted with respect to which judgments, dates that responses are to be received, which banks have responded to inquiries regarding defendants' bank accounts, which banks have been served process with respect to which defendants, the dates that responses have been received, and which banks have restrained funds in response to process and in what amounts. Each tracking field in database 22 should contain a date field so that a report can be generated on demand based on a date range or based on a user-definable response due date.

Other databases 24 and 26 operatively coupled to CPU 10 contain bank identification information and bank addresses. The bank identification information in database 24 may include the routing numbers and zip codes. Preferably, the bank addresses in database 26 are appropriate headquarters addresses for the service of process.

A further database 28 operatively linked to CPU 10 contains a table of mail zip codes. In table 28, each zip code within at least one part of a state of the United States of America or other country is paired with a list of all geographically contiguous zip codes. Accordingly, CPU 10 accesses table 28 to determine, for any given zip code, the zip code areas surrounding the given zip code. Upon determining all zip codes contiguous with a given zip code, CPU 10 accesses databases 24 to determine which bank branches have addresses with the given zip code or any of the contiguous zip codes.

A text processor 30 operatively tied to CPU 10 is used by the CPU to mail merge the headquarters addresses of the located bank branches with previously composed correspondence such as a restraining notice or a letter inquiring as to bank accounts owned by one or more named judgment defendants. The mail merged correspondence, as well as the addresses of the subject banks, is then output by CPU 10 on letter head stationery via printer 16. Computer or CPU 10 can also print tabular reports and mailing labels via printer 16.

Yet another database 32 operatively connected to CPU 10 contains a table of counties in the state. In that table 32, each county is paired with a list of contiguous counties. In addition, each county is pair with a list of respective zip codes contained within the county. Accordingly, CPU 10 can access table 32 to determine, for any given county, the counties surrounding the given county in a given state. Upon determining all counties contiguous with a given county, CPU 10 again accesses table 32 to determine all zip codes in the given county and the contiguous counties. Then, CPU 10 can access databases 24 and 26 to determine which bank branches have addresses with the given county or any of the contiguous counties. To facilitate the determination of a county in which a particular zip code is located, zip code table 28 or county table 32 contains a list of all zip codes in the given state with their respective associated counties.

Figure 2:
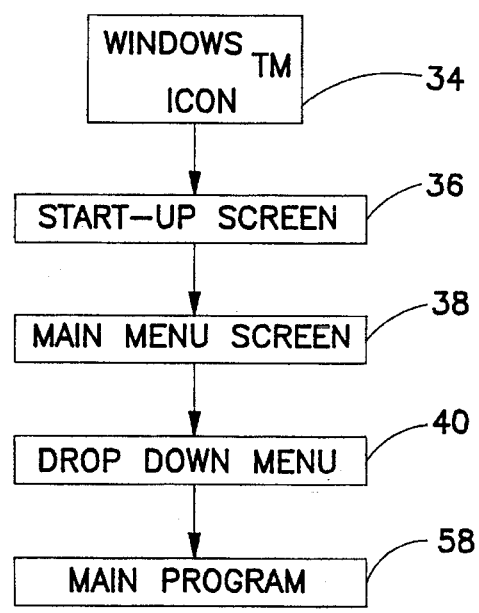
FIG. 2 is a general flow chart diagram for a central processing unit shown in FIG. 1.

As depicted in FIG. 2, the judgment collections program is called into operation on computer or CPU 10 via an icon in Microsoft WINDOWS™ (step 34). After the display of a start up screen in a step 36, a main menu screen is displayed in a step 38. The main menu screen includes a political map of the country, e.g., the United States, with those states highlighted (e.g. by color or brightness) which are included in databases 24, 26, 28, and 32. As indicated by a step 40 in FIG. 2, a drop down menu may appear over the main menu screen, for example, in response to an activation of a selected key of keyboard 12 or in response to a clicking of a mouse 42 (FIG. 1) at a selector location on the screen of monitor 18.

Figure 3:
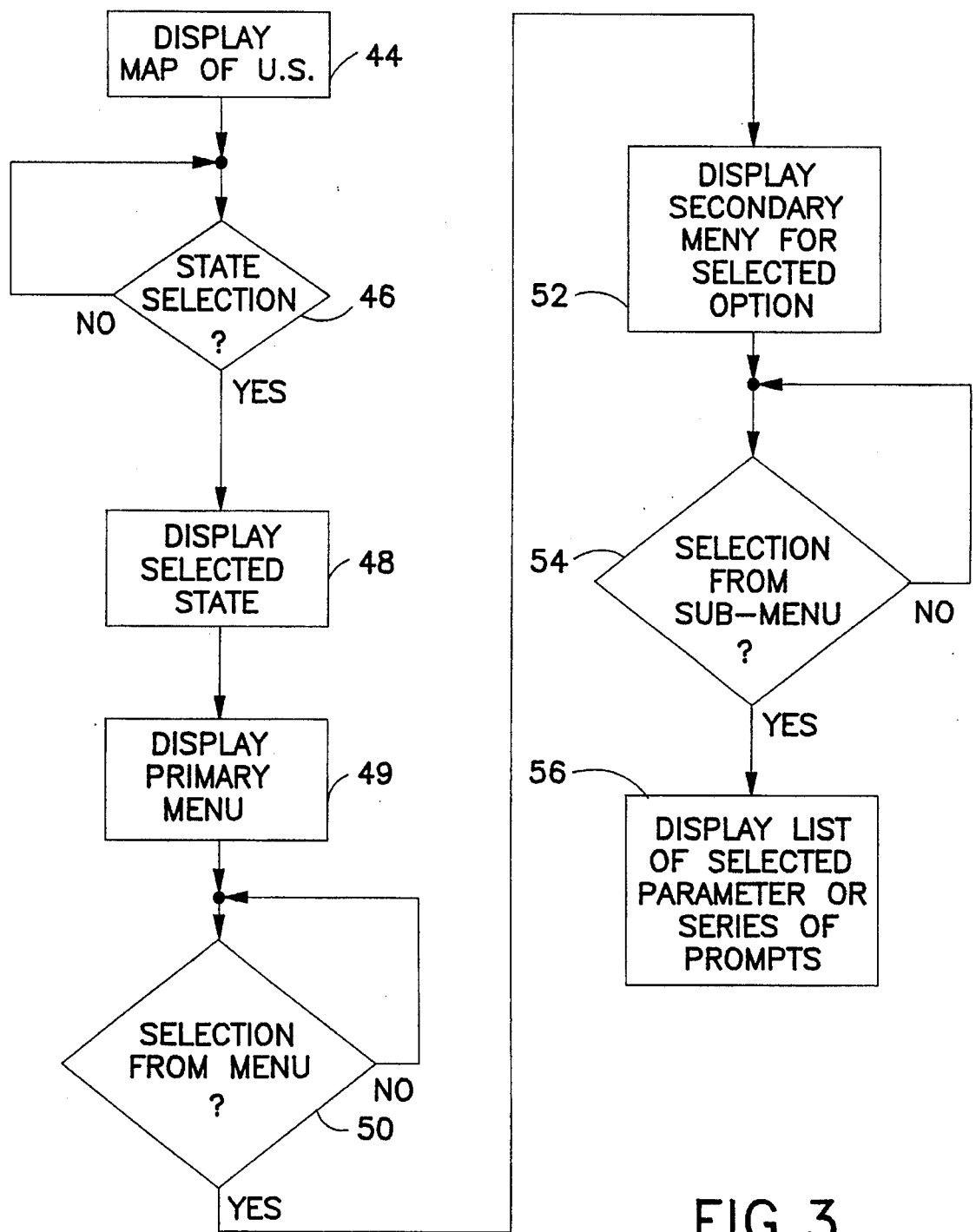
FIG. 3 is a flow chart diagram showing steps executed by the central processing unit of FIG. 1 in the main menu step of FIG. 2.

FIG. 3 illustrates in greater detail a series of programming steps executed by computer or CPU 10 in steps 38 and 40 of FIG. 2. In a step 44, CPU 10 displays a political map of the country, as discussed above with reference to step 38 in FIG. 2. At a decision junction 46, CPU 10 monitors signals from mouse 42 to determine whether the user or operator has activated button of mouse 42, thereby selecting a state. If a state has been selected by the user, CPU 10 displays a county-by-county map of the selected state on monitor 18 in a step 48. In this full state map, counties are highlighted (e.g. by color or brightness) which are included in databases 24, 26, 28, and 32. Alternatively, a pop-up window lists the counties which may be accessed in databases 24, 26, 28, and 32. In addition to the selected state, CPU 10 displays the drop down menu in a step 49 and checks in an inquiry 50 whether the user has made a selection from the menu, either by activating a selected key of keyboard 12 or by clicking a button of mouse 42.

The drop down menu displayed in step 40 with the map of the selected state covers the following options: judgments, documents, banks, reports, and settings. Upon detecting at inquiry 50 that the user has made a menu selection, CPU 10 displays a secondary menu for the selected option in a step 52. For the judgments option, the secondary menu lists "Enter" and "Update" as choices. For the documents option, the secondary menu lists "Import, " "Create," "and Modify" as choices The banks option includes choices "Add/Update, " "Disk" "BBS" and "Service Addresses." Under the reports option, the secondary menu includes the following choices: "List of Judgments," "Responses Awaiting," "Responses Received, " "Funds Restrained," and "Cost Accounting." The settings option includes "Costs" and "Defaults" as choices. Costs which may be preset include certified mail postage, return postage, envelopes and labels, and labor.

As further depicted in FIG. 3, CPU 10 checks in an inquiry step 54 whether the user has made a selection from the secondary or sub-menu for the selected option. Upon determining as a result of inquiry 54 that another selection has been made, CPU 10 displays in a step 56 a list of selected parameters or a series of prompts and awaits selections from keyboard 16 or mouse 42.

For example, upon selection of the "Entry" choice under the judgments option, computer or CPU 10 solicits the following information: a record identification number, a client billing code, a client reference number, an attorney reference number, a defendant's name (required), an address of the defendant or debtor (street, city, state, and zip code), the social security number of the defendant, the date of birth of the defendant debtor, the employment type of the defendant/debtor (SIC code), the judgment date, the original amount of the judgment, an interest rate on the judgment (the judgment amount with interest is calculated by CPU 10), a percentage of the judgment to be an attorney contingency fee or alternatively a flat fee maximum amount for the collection, the client's allowable budget as a percent of the judgment amount, the court name, the court county, the court index number, the plaintiff's name, the attorney's name, the attorney's address (street, city, state, and zip code), whether defendant is a government employee, and the cost per mailing document.

Some of the entries may be preselected via the "Default" choice of the settings option. These entries include the interest rate on the judgment, the contingency fee percentage, the client's allowable budget as a percent of the judgment amount, the particulars as to the attorney, and the cost per mailing document.

The documents option of the main menu is for purposes of generating correspondence forms for use in collections. The "Disk" choice of the banks option enables bank information to be incorporated from floppy disks. The "Service Address" choice enables attorney modification of addresses for adapting mailing or office addresses for purposes of process service. The report option enables a user to tailor the reports for different purposes.

Figure 4:
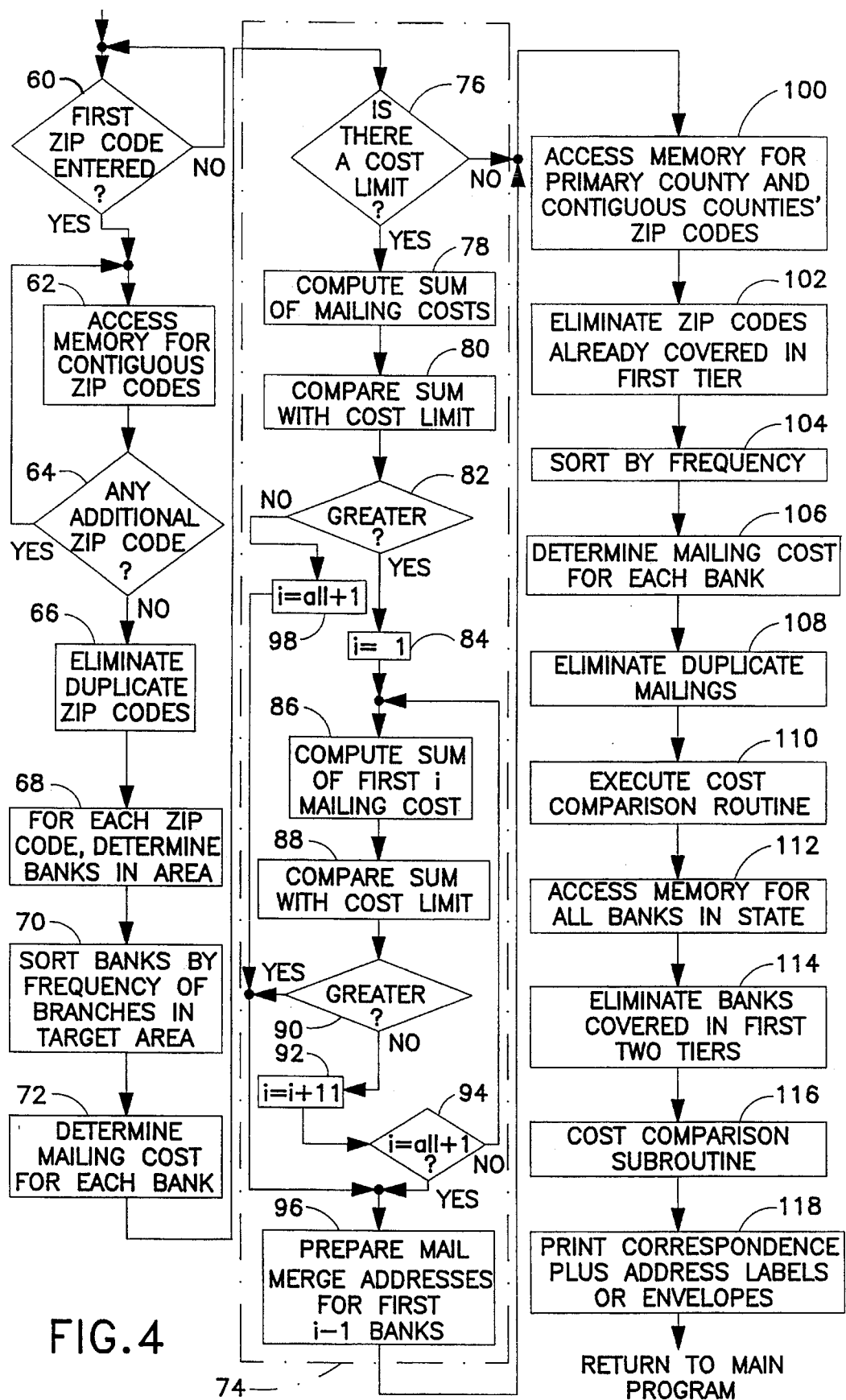
FIG. 4 is a flow chart diagram showing a series of steps executed by the central processing unit of FIG. 1 in the main program of a collections method in accordance with the present invention.

Upon completing desired program modifications via the options menu and the different submenus, a user exits the menu part of the program to the main program, illustrated as a step 58 in FIG. 2. As depicted in FIG. 4, in main program 58 the computer or CPU 10 first inquires at 60 whether a first zip code has been entered. This zip code may be taken from the defendant's address entered during the soliciting of information in the judgments option. CPU 10 may prompt the user as to whether this zip code is to be used in the main program 58.

Upon determining at inquiry 60 that a zip code has been entered or selected, CPU 10 accesses memory or database 28 in a step 62 to determine all zip codes contiguous to the entered or selected zip code. CPU 10 then inquires at 64 whether there are any additional zip codes to be considered. If this inquiry has an affirmative result, CPU 10 again accesses memory or database 28 in step 62 to determine all zip codes contiguous to the additional entered or selected zip code(s). An additional zip code may correspond to a business address of the defendant or a relative's address (e.g., a parent's address).

Upon determining that all zip codes have been entered, CPU 10 eliminates duplicate zip codes in a step 66 and then, in a step 68, first accesses database 24 to ascertain all the bank branches in a target area(s) corresponding to the entered zip code(s) and all contiguous zip codes and subsequently accesses database 26 to determine, for each bank having one or more branches in the target area, the headquarters address. In a step 70, the banks are then sorted by the frequencies of the branches in the target area (e.g., a single county or all counties in a selected metropolitan area). Based on the resulting list of banks, CPU 10 determines in a step 72 the mailing cost for each bank. The results of this determination may be stored in memory, e.g., in database 22.

In a subsequently executed subroutine 74, computer or CPU 10 ascertains whether the available funds are sufficient for the projected mailing. In the event that the funds are insufficient, the mailing is terminated after the funds have been exhausted. In subroutine 74, CPU 10 first investigates at 76 whether there is a cost limit. This investigation entails accessing database 20 to check the entries whether a percentage contingency fee or a flat fee maximum amount has been entered for the collection process. If there is a cost limit, CPU 10 computes in a step 78 a total mailing cost as a sum of the mailing costs determined in step 72. Then, CPU 10 compares the total mailing cost in a step 80 with the entered cost limit. If the total mailing cost is greater than the entered cost limit, as determined at a decision junction 82, CPU 10 sets a temporary parameter i equal to 1 (step 84) and determines the sum of the first i mailing costs (step 86). In a step 88, the partial mailing cost sum is compared with the cost limit. If the computed partial sum is less than the cost limit, as determined at an inquiry 90, CPU 10 increments parameter i in a step 92 and again computes the partial sum in step 86. The new sum is compared with the cost limit (step 88). If the newly computed partial sum is still less than the cost limit, as determined at inquiry 90, steps 92, 86, 88, and 90 are again executed. The computer or CPU continues to compare partial sums until all of the mailing costs from step 72 have been added into the sum, as determined at an inquiry 94, or until a computed partial sum is determined to be greater than the cost limit. In response to an instruction (not shown) from keyboard 16 or mouse 42, computer or CPU 10 then prepares mail merge addresses for the first i-1 banks (total mailing cost less than cost limit) in a step 96. Step 96 is also performed upon a determination by CPU 10 at decision junction 82 that the total sum is not greater than the cost limit. In that event, the computation parameter i is one greater than the number of all the banks in the target area (step 98).

The target banks determined by CPU 10 as of step 72 represent a first tier of banks, namely, those institutions which are statistically most likely to be depositories for funds of the defendant/debtor. To determine banks in a second tier of institutions, i.e., those having a next highest likelihood of containing funds of a defendant/debtor, CPU 10 executes a step 100 in which it accesses memory or database 32 for a list of counties contiguous to the primary county, that is, the county containing the zip code determined in inquiry 60. As discussed above, it is contemplated that this given zip code corresponds to a residence or business address of the defendant/debtor. As discussed above, the primary county is determined by CPU 10 upon accessing database 28 or 32. In step 100, CPU 10 also determines all the zip codes contained in the primary county and the secondary counties contiguous thereto.

Upon determining the zip codes in the primary county and the contiguous counties in step 100, CPU 10 eliminates zip codes already covered in the first tier (step 102). In a step 104, CPU 10 accesses databases 24 and 26 in a step 104 to determine all the bank branches in a second-tier target area(s) corresponding to the primary county and all contiguous counties. In step 104, CPU 10 also sorts the banks by the frequencies of the branches in the second-tier target area. Based on the resulting list of banks, CPU 10 determines in a step 106 the mailing cost for each of the second-tier banking institutions. Duplicate mailings are eliminated in a step 108. The second-tier banks and their respective mailing costs may be stored in memory, e.g., in database 22 or 24.

Upon determining the second-tier banks and the mailing costs, CPU 10 executes a cost containment subroutine 110. Basically, subroutine 110 is identical to subroutine 74 except that the cost limit is the original cost limit less the total cost of the first-tier mailing as determined in step 86. After the completion of cost containment subroutine 110, CPU 10 may prepare mail merge addresses for the second-tier banks in a non-illustrated step similar to step 96.

In a subsequent step 112, CPU 10 accesses databases 24 and 26, and possibly database 32, to determine banks in a third tier of institutions, i.e., those having a third highest likelihood of containing funds of a defendant/debtor. The third tier includes all banks in the state. These banks may be all the banks listed in databases 24 and 26. Alternatively, if databases 24 and 26 include banks from outside the state, then CPU 10 may initially access database 32 to determine all the zip codes in the state and subsequently access databases 24 and 26 to determine all the banks in the collection of the state's zip codes.

In a step 114, CPU 10 eliminates banks already covered in the first two tiers. Subsequently, a cost comparison subroutine 116 substantially identical to subroutine 110 is executed for purposes of ensuring that cost limit is not exceeded. In a final step 118, which is generally initiated only in response to a signal from keyboard 16 or mouse 42, CPU 10 prints correspondence to the mail merged addresses, the correspondence being created, modified and possibly imported from other programs pursuant to the documents option of the primary or main menu.

The printing step 118 may be initiated from another part of the program, for example, from a display of all the tiers in a split screen and lists of the banks in each tier. It is to be noted that the display of the tiers preferably includes an indicator as to the cost cut-off point. Only banks on the list above the cost cut-off point are targeted by the mailing program. The banks below the cost cut-off point have been eliminated from the mailing for cost reasons. The indicator may comprise a highlighted region such as a red bar extending horizontally across one of the tier regions. The screen display may also show counts of records, and mailing costs.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method executed by a general purpose digital computer for generating a bank mailing list, comprising:
   (a) storing, in a first memory location of said computer, a plurality of zip codes, each of the stored zip codes being geographically associated with at least one other stored zip code, a geographical area represented by a given stored zip code being contiguous with a geographical area represented by each stored zip code associated with the given stored zip code;
   (b) storing, in a second memory location of said computer, a plurality of bank postal addresses, each of said bank addresses including a bank zip code;
   (c) receiving input, from a user of said computer, identifying a zip code of said defendant;
   (d) selecting a target zip code, from among said stored zip codes, matching said zip code of said defendant;
   (e) selecting a primary zip code, from among said stored zip codes, geographically associated with said target zip code;
   (f) selecting a first-tier bank address having a bank zip code matching at least one of said target zip code said primary zip code;
   (g) transmitting to a printer said first-tier bank address; and
   (h) operating said printer to print said first-tier bank address.

2. The method defined in claim 1 wherein steps (e)–(h) are repeated a plurality of times.

3. The method defined in claim 2 wherein a primary zip code is selected in step (e) only upon a determination that such primary zip code has not been selected in any prior iteration of step (e).

4. The method defined in claim 2, further comprising:
   receiving input, from a user of said computer, identifying a mailing cost for mailing correspondence to each of said bank addresses;
   receiving input, from a user of said computer, identifying a spending limit amount;
   prior to each iteration of step (g), calculating a projected total mailing cost by summing said mailing costs for each first-tier bank address; and
   terminating said step of transmitting upon a determination that said projected total mailing cost is greater than or equal to said spending limit amount.

5. The method defined in claim 1, further comprising:
   (i) storing, in a third memory location of said computer, a plurality of stored names of counties, each of said counties being geographically associated with at least one of said stored zip codes, a geographical area represented by a given stored zip code being located at least partially within a geographical area represented by each county associated with such given stored zip code;
   (j) selecting a primary county geographically associated with said target zip code;
   (k) selecting a secondary zip code, from among said stored zip codes, geographically associated with the selected primary county;
   (l) selecting a second-tier bank address having a bank zip code matching said secondary zip code;

(m) transmitting to a printer said second-tier bank address; and (n) operating said printer to print said second-tier bank address.

6. The method defined in claim 5 wherein steps (k)–(n) are performed a plurality of times.

7. The method defined in claim 6 wherein a secondary zip code is selected in step (k) only upon a determination that said secondary zip code has not been selected in any prior iteration of step (k) and step (e).

8. The method defined in claim 5, wherein each stored county name is associated with at least one other stored county name, a geographical area of any given county being contiguous with a geographical area of each county geographically associated with such given county, further comprising:

(o) selecting a secondary county associated with said primary county;

(p) selecting an additional secondary zip code, from among said stored zip codes, associated with said secondary county;

(q) selecting an additional second-tier bank address having a bank zip code matching said additional secondary zip code;

(r) transmitting to a printer said additional second-tier bank address; and (s) operating said printer to print said additional second-tier bank address.

9. The method defined in claim 8, wherein steps (p)–(s) are performed a plurality of times.

10. The method defined in claim 9, wherein an additional secondary zip code is selected in a step (t) only upon a determination that said additional secondary zip code has not been selected in any prior iteration of step (o), step (k), and step (e).

11. A system for generating a bank mailing list, comprising:

(1) a computer including:

a first memory having stored therein a plurality of stored zip codes, each of the stored zip codes being associated with at least one other stored zip code, a geographical area represented by each stored zip code being contiguous with a geographical area represented by each associated stored zip code;

a second memory having stored therein a plurality of bank postal addresses, each of said bank addresses including a bank zip code;

means for inputting from a user of said computer a zip code of said defendant;

means for selecting a target zip code, from among said stored zip codes, matching said zip code of said defendant;

means for selecting a primary zip code, from among said stored zip codes, associated with said target zip code; and means for selecting a first-tier bank address having a bank zip code matching at least one of said target zip code said primary zip code;

(2) a printer for printing said first-tier bank address; and (3) means for transmitting to said printer said first-tier bank address.

* * * * *